Feb. 7, 1939. J. E. LEONARD 2,146,635
PROJECTION APPARATUS FOR COLOR PHOTOGRAPHY
Filed Jan. 22, 1938 3 Sheets-Sheet 1

INVENTOR.
John E. Leonard
BY Lancaster, Allwine and Rommel
ATTORNEYS.

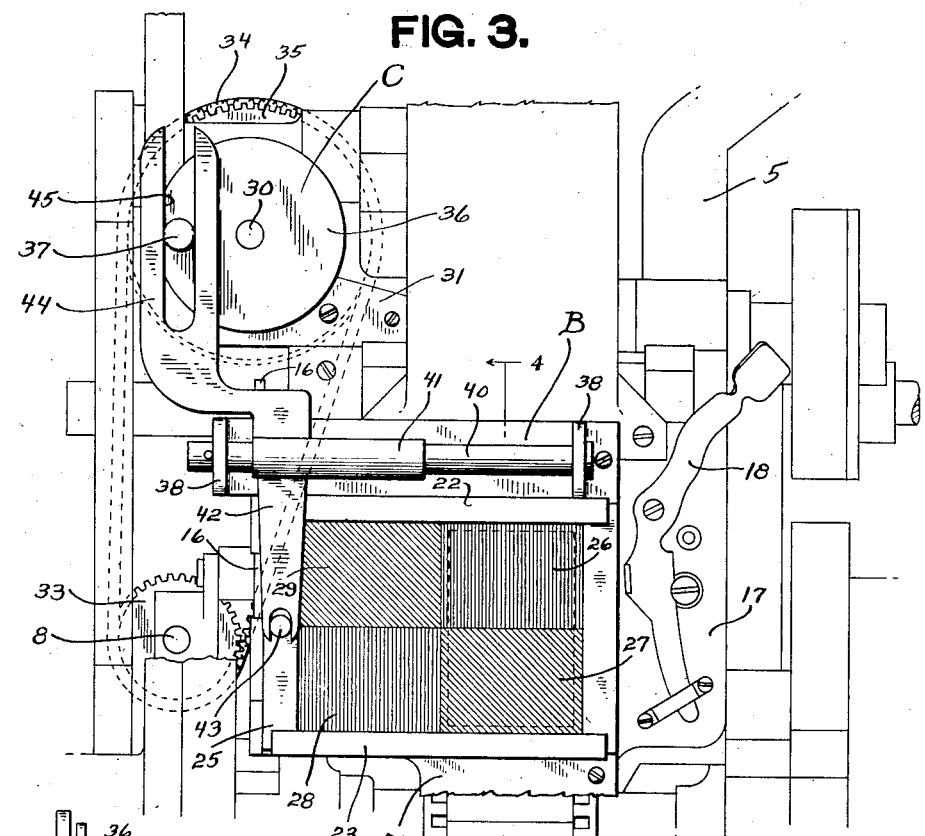
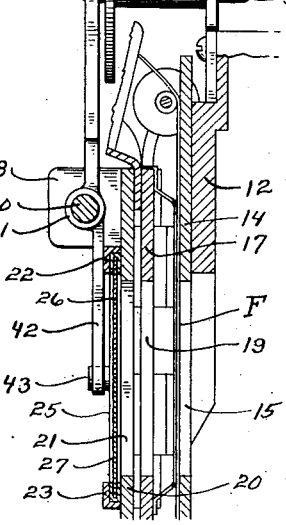
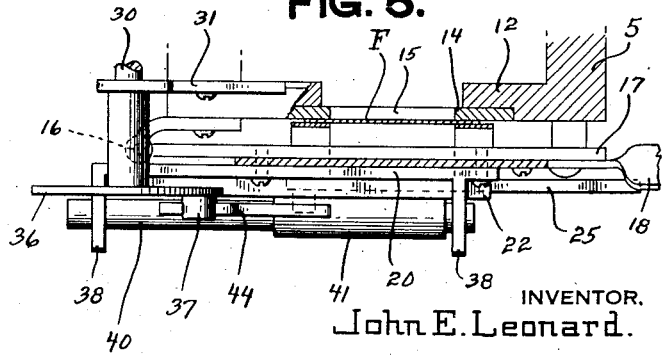

Feb. 7, 1939.   J. E. LEONARD   2,146,635
PROJECTION APPARATUS FOR COLOR PHOTOGRAPHY
Filed Jan. 22, 1938   3 Sheets-Sheet 3

INVENTOR.
John E. Leonard.

BY Lancaster, Allwine & Rommel
ATTORNEYS.

Patented Feb. 7, 1939

2,146,635

UNITED STATES PATENT OFFICE 2,146,635

PROJECTION APPARATUS FOR COLOR PHOTOGRAPHY

John E. Leonard, Berwick, Pa.

Application January 22, 1938, Serial No. 186,415

2 Claims. (Cl. 88—16.4)

The present invention relates to apparatus for recording and reproducing motion pictures in their natural color.

The primary object of the invention is to provide apparatus for obtaining by photography and projection, scenes or images in color, thru use of a single linear film strip such as motion picture films; and the present invention relates particularly to apparatus for projecting motion picture film strips having a series of images or frames of different color values alternately recorded in sequence thereon as by means of a camera such as disclosed in my co-pending application Serial Number 186,414 filed under even date of this application. The co-pending camera application referred to, discloses apparatus for taking pictures in sequence on a single panchromatic film strip, with each succeeding picture or frame being taken thru a color filter of different color value or density such as red and green whereby one frame records the red components of the scene and the next the green components of the scene.

To this end, an object of the invention is to provide projection apparatus for reproducing in natural color upon a viewing screen the scenes which have been photographically recorded upon a linear film by such camera. In the projection apparatus of this invention, the film strip upon which the pictures or frames have been recorded in sequence is advanced one picture area or frame at a time with each frame projected twice, two adjacent frames being projected simultaneously and superimposed upon the viewing screen thru special color filter apparatus so associated with the film movements as to have each frame during each of its projection periods projected thru a color filter of like value as that of the frame. Thus, the two frames which are projected simultaneously and in superimposed relation upon the same screen area are of different color values and each frame is twice projected thru the filter of its corresponding color value which is arranged to align therewith in each position of exposure of the frame.

A further object of the invention is to provide an improved and simplified apparatus for making color photography without extra cost to the producers.

A further and important object is to provide apparatus of this character which may be readily applied to motion picture projectors now in use and without requiring any alterations being made to the usual film driving mechanism for intermittently feeding the film one picture area or frame at a step, even tho with my invention two frames are simultaneously projected.

Other objects and advantages of the invention will be apparent from the following detailed description, taken in connection with the accompanying drawings, forming a part of this specification and in which drawings:—

Figure 3 is an enlarged plan view looking at the rear of the projector head and showing the filter shuttle and the driving means therefor.

Figure 4 is a fragmentary vertical section substantially on the line 4—4 of Figure 3.

Figure 5 is a top plan view of the showing in Figure 4 and showing portions of the projector head in horizontal section.

Figure 1:
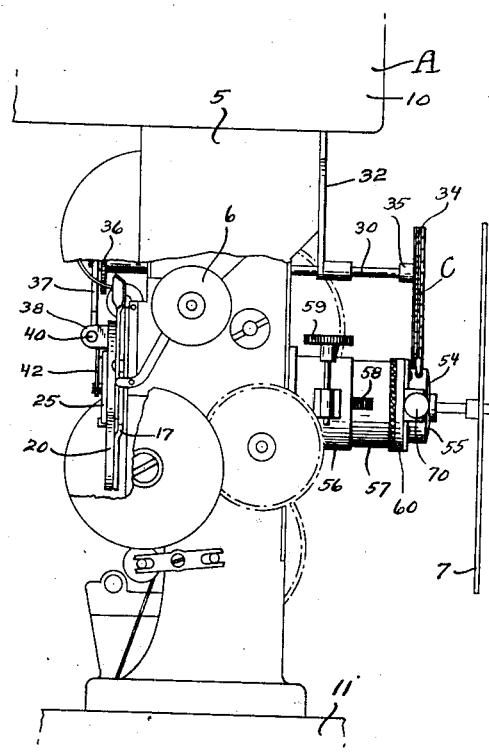
Figure 1 is a fragmentary side view of a motion picture projector showing the invention applied and with portions of the projector head broken away.
Figure 2:
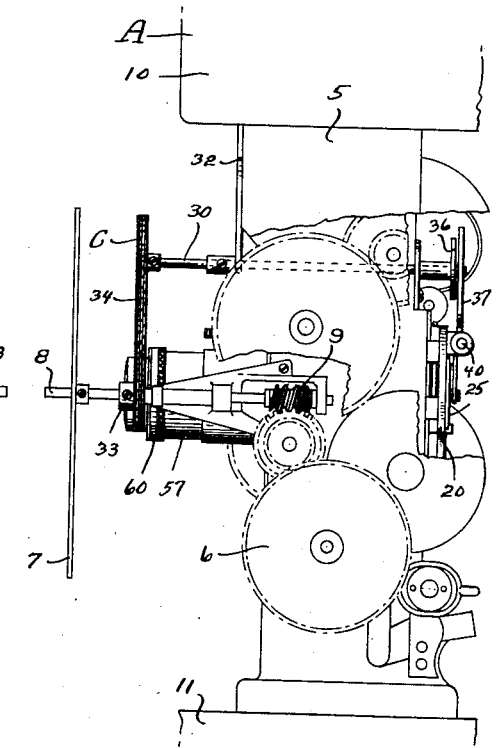
Figure 2 is a view similar to Figure 1 and looking at the opposite side of the projector from that shown in Figure 1.

Referring to the drawings in detail and wherein like reference characters designate corresponding parts thruout the views, the letter A designates a motion picture projection machine of usual construction comprising a projector head 5 containing the usual film driving mechanism 6 for intermittently moving or advancing the film one picture area or frame at each picture cycle, and at the same time rotating the shutter 7 in front of the projection lens of the machine, the shutter 7 being carried upon the forward portion of the continuously rotated shutter shaft 8. The shutter shaft 8 carries a worm 9 which meshes with a worm gear of the driving mechanism 7 whereby the shaft 8 makes one complete revolution for each picture cycle i. e., the entire series of mechanical operations of the mechanism 6 which take place between the positioning of one frame of film and the positioning of the next frame. The projector A is provided with the usual upper and lower film magazines 10 and 11 respectively for the film reels. The film driving mechanism 6 may be driven in any suitable manner.

Mounted in the rear wall 12 of the projector head 5 is an aperture plate 14 arranged to mask off the portion of the film strip F which is in alignment with the source of light and the projection lens of the machine. With the usual projector, the opening in the aperture plate is of a size to expose only one frame of the film during projection. In the present invention, however, the oblong opening 15 in the aperture plate 14 has greater height than width and is of such size to mask off two immediately adjacent individual frames of the film during exposure or projection. It may here be well to mention that while the opening 15 in the aperture plate 14 unmasks two immediately adjacent frames at one time, the film is only advanced one frame at each picture cycle.

Hingedly mounted at one vertical side edge as by a hinge pin 16 upon the rear wall 12 of the projector head is an aperture gate 17 adapted to be swung into parallel relation over the aperture plate 14. A suitable latch 18 releasably retains the aperture gate in operative film holding relation to the aperture plate 14. The aperture gate is provided with the usual idler rollers and spring shoes for retaining the film in sliding contact with the aperture plate. The aperture gate 17 is provided with an oblong opening 19 having dimensions equal to that of the opening 15 in the aperture plate 14 and this opening 19 is adapted to align with the opening 15 when the aperture gate is in operative relation to the aperture plate. Thus the opening 19 in the gate 17 is of a size to unmask two adjacent frames on the film simultaneously.

Associated with the aperture gate 17 is a color filter means B which is operated in timed relation to the picture cycle by driving means C operatively connected with the film driving mechanism 6.

The color filter means B embodies a mounting plate 20 suitably secured to the outer face of the aperture gate 17. This mounting plate 20 is provided with an oblong opening 21 having dimensions equal to that of the openings 15 and 19 of a size equal to two frames of the film. This opening 21 aligns with the opening 19. Provided on the outer face of the mounting plate 20 are upper and lower guide channels 22 and 23 respectively which are disposed slightly beyond the upper and lower limits of the opening 21. These guide channels 22 and 23 form guides for horizontal reciprocatory movement of a filter shuttle 24.

The filter shuttle 24 is reciprocally movable by the driving means C and embodies a rectangular-shaped frame 25 in which is mounted four color filters 26, 27, 28 and 29. These color filters may be of colored glass, Celluloid or the like and are of different color values or density and in the example shown, filters 26 and 28 are red while the filters 27 and 29 are green. As shown particularly in Figures 3 and 9, the filters are arranged in vertically disposed pairs, the filters 26 and 27 constituting one pair and the filters 28 and 29 constituting the other pair. It will also be noted that the positions of the color filters is reversed in each of the pairs of filters, the red filter being uppermost in one pair and lowermost in the other pair of filters. When the filter shuttle is in the position shown in Figure 3, the color filters 26 and 27 align with the opening 21 with the dividing line between the filters 26 and 27 aligning with the frame line dividing the two frames of the film aligning with the aperture opening 15. Therefore, the red color filter 26 is in alignment with the upper frame exposed at the opening 15 and the green filter 27 is in alignment with the lower frame exposed at the opening 15. When the filter shuttle is moved to the right, viewing Figure 3, the color filters 28 and 29 will align with the opening 21 so as to align the green filter 29 with the upper frame of the film and the red color filter 28 with the lower frame of the film. Thus the positions of like color filters are transposed in the two projection positions of the filter shuttle.

Referring now to the driving means C for imparting reciprocatory movement to the filter shuttle 24 in timed relation to intermittent movement of the film strip, this means comprises a drive shaft 30 journaled in suitable brackets 31 and 32 secured to the projector head 5 whereby the shaft 30 extends along one side of the projector head in parallel relation to and spaced above the shutter shaft 8. Secured upon the shutter shaft 8 rearwardly of the shutter 7 is a sprocket wheel 33 over which is trained a sprocket chain 34 which is trained over a sprocket wheel 35 secured upon the forward end of the shuttle drive shaft 30. These sprockets 33 and 35 have a ratio of two to one whereby for each revolution of the shutter shaft 8 the shuttle drive shaft 30 will be rotated for one-half of a revolution. Thus the speed of the shaft 30 is one-half that of the shaft 8.

Mounted upon the rear end of the shaft 30 is a crank disc 36 provided with a crank pin 37 projecting from the rear face of the disc. Mounted at its end in suitable brackets 38 provided on the upper portion of the mounting plate 20 and extending horizontally above the upper guide channel 22 is a guide shaft 40. Reciprocally guided on the shaft 40 is a tubular slide 41 carrying a depending arm 42 having a forked lower end receiving a pin 43 projecting rearwardly from an end rail of the shuttle frame 25. Extending upwardly from the slide tube 41 is a forked arm 44 providing a vertical slot 45 for receiving the crank pin 37. With this drive connection between the crank disc 36 and the shuttle 24, a reciprocatory movement will be imparted to the shuttle for alternately aligning the pairs of color filters 26—27 and 28—29 with the opening 21.

Referring particularly to Figure 3 and to the movement of the filter shuttle 24, since the shaft 30 makes one complete revolution for two picture cycles of the projector, the position of the shuttle will be reversed or changed for each picture cycle so that during the projection period of one picture cycle, the red filter 26 aligns with the upper exposed frame and during the projection period of the next picture cycle the green filter 29 aligns with the upper frame of the film. It will also be noted that the filters are of a width slightly greater than the width of the projection openings 15, 19 and 21 and this is to prevent overlapping of the different colored filters at the interval in the picture cycle between the moving and stationary periods of the film. When the crank pin 37 is approaching and receding from its dead center positions, that is, at each end of the shuttle shifting strokes of the forked arm 44, the crank pin is substantially in a position of dwell so that the shuttle 24 is substantially at rest for the interval of time during the projection period of the two film frames. During the moving period, i. e., that portion of the picture cycle during which the film at the aperture is in motion, the color shuttle 24 is shifted from one to the other of its projection positions. Thus, the filter shuttle is substantially at rest during the stationary period of the picture cycle, and is moved or shifted simultaneously with the advancing of the film during the moving period of the picture cycle.

Figure 9:
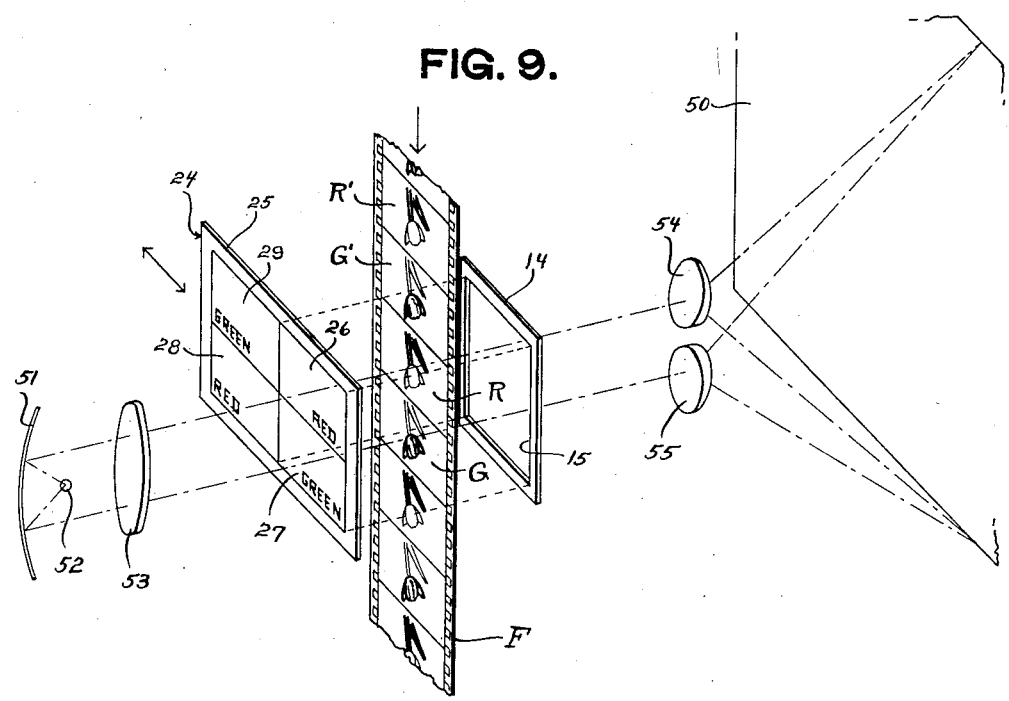
Figure 9 is a schematic diagram of the optical system for simultaneously projecting two frames in superimposed relation on the viewing screen.

Referring now to the optical system of the projector as shown diagrammatically in Figure 9, the system is such as to project the images of the two frames of different color value exposed at the aperture plate 14, in superimposed relation upon the viewing screen 50. In Figure 9, a parabolic mirror reflector 51 directs light rays from the source of light 52 thru the condensing lens 53 which focuses the light upon the aperture plate 14. While not limited to such, in the example shown, the filter shuttle 24 is disposed between the lens 53 and the film strip F. Projection lenses 54 and 55 in the form of prismatic lenses are arranged to bend the rays of light passing thru the same equally so that the two images from the two exposed frames will be focused in superimposed relation upon the viewing screen 50. The upper prismatic lens 54 will project one frame of the film while the lower prismatic lens 55 will project the other exposed frame of the film. Thus two individual frames of different color value are projected simultaneously and superimposed upon the viewing screen, and each frame aligns with a color filter of a value corresponding to the color value of that frame.

The mounting for the lenses 54 and 55 comprises a stationary collar 56 mounted upon the front wall of the projector head 5 in alignment with the opening 15 in the aperture plate 14. Slidably fitting in the collar 56 is a sleeve 57 provided with a longitudinal rack 58 with which a pinion, not shown, rotatable by a thumb nut 59 meshes whereby the sleeve may be adjusted longitudinally in the collar 56 for focusing the lenses 54 and 55. Fitting with a slip fit over the outer or forward end of the sleeve 57 is a cap 60 providing a mounting for the superposed lenses 54 and 55. Mounted upon the forward face of the cap 60 is a flat face plate 61 having upper and lower openings 62 and 63 respectively which align with corresponding openings in the cap 60. Provided along each vertical side edge of the plate 61 is a guide 64 and these guides are undercut at their inner edges to provide dovetailed grooves for slidably receiving the beveled side edges of a pair of relatively movable upper and lower carrier plates 65 and 66 respectively. Mounted respectively upon the plates 65 and 66 are lens tubes 67 and 68 which extend forwardly from the plates and in the outer ends of which are mounted the prismatic lenses 54 and 55. These lens tubes 67 and 68 are independently rotatable in their respective carrier plates whereby the lenses 54 and 55 may be rotatably adjusted relative to one another; and one of the lens tubes, and in the example shown, the upper lens tube 67 is provided with a radial extension or arm 69 for final relative adjustment of the lenses.

Figure 6:
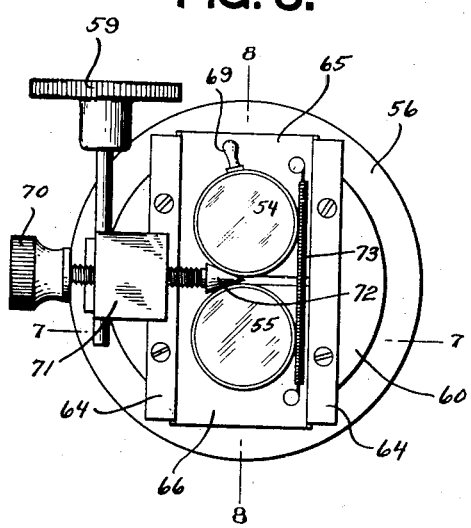
Figure 6 is an enlarged face view of the projection lens plate or carrier.
Figure 7:
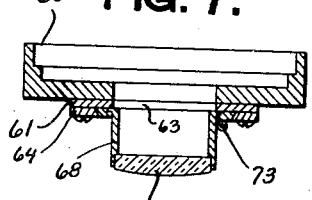
Figures 7 and 8 are sections on the respective lines in Figure 6.
Figure 8:
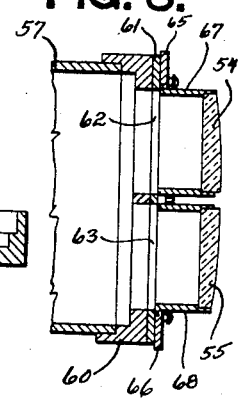

A means is also provided for adjusting the vertical spacing between the lenses and this means embodies an adjusting screw 70 threaded thru a boss 71 provided on the cap 60 midway of the height of one of the guides 64 whereby the screw 70 has a horizontal movement at a right angle to the vertical sliding movement of the plates 65 and 66. The inner end of the screw 70 is provided with a conical-shaped head 72 which extends between the two lens tubes 67 and 68 with the axis of the conical head at a right angle to the axis of the tubes as shown in Figure 6. With this arrangement, when the screw 70 is fed inwardly, the tapered surface of the head 72 acts upon the annular surfaces of both of the lens tubes 67 and 68 with a vertical spreading action upon the tubes. For holding the lens tubes in contact with the conical head 72, a coil spring 73 is provided, one end of which is attached to the upper carrier plate 65 and the other end of which is attached to the lower carrier plate 66, whereby the carrier plates are normally urged toward one another. Thru the various adjustments of the lenses 54 and 55, the two individual images which are exposed at the aperture plate 14 may be projected in exact superimposed relation upon the screen 50.

Figure 10:
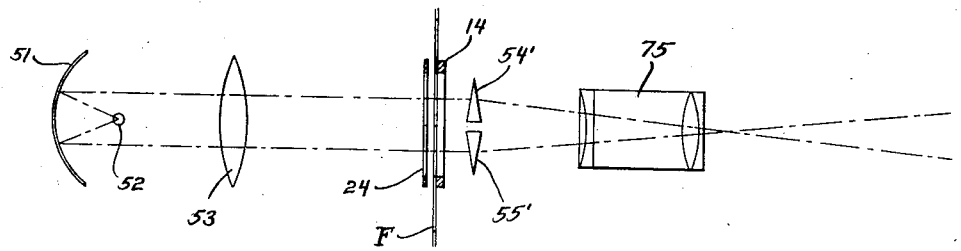
Figure 10 is a schematic diagram showing a modified form of optical system.

Figure 10 shows a modified form of the optical system wherein the usual projection lens as at 75 may be employed in connection with the prismatic superposing lenses 54' and 55', these lenses being interposed between the projection lens 75 and the aperture plate 14.

Referring particularly to Figure 9, and to the illustration of the positive film strip F, it will be seen that the image of the flower varies in density in the adjacent frames of the film. For the purpose of explanation, certain of the frames have been identified in sequence by the characters G, R, G' and R' in the order of travel of the frames downwardly past the aperture plate 14. In my co-pending application referred to, relating to a camera designed for taking motion pictures adapted for use with the present projector apparatus, the pictures are taken in sequence upon the negative film strips, one thru a green filter and the next thru a red filter, so that adjacent frames will have different color values or vary in density in accordance with the light rays passed by the different colored filters. After the negative film has been exposed, the handling or developing may be carried out in the same manner as that employed in connection with the ordinary black and white panchromatic film, and the positive film is made on regular positive stock and may be projected in the ordinary manner if no color effects are desired. In Figure 9, the frames such as R and R' are of the pictures taken thru a red color filter, while the frames G and G' are of the pictures taken thru a green color filter with my camera.

On the film F it will be observed that the flower taken thru the green filter and which may be termed the "green side" is very dense and clearly defined, while the flower taken thru the red filter and which may be termed the "red side" is quite faint. Now, if two of these frames of different color values are simultaneously exposed in a projector and a red color filter associated with the "red side" and a green color filter associated with the "green side", the rays of light passing thru the film will be checked according to the density of the film and the exposed portions of the flower taken thru the green color filter will mask out the flower while the unexposed portions of the flower taken thru the red color filter permit the light rays to pass and be projected upon the viewing screen. By superimposing these two pictures, the flower will be projected in natural colors upon the screen. The faint outline of the flower in the "red side" will permit the red rays to pass, while the density of the flower in the "green side" will prevent passage of the green rays. On the "green side" however, the foliage of the flower is faint thus allowing the green rays to be projected upon the screen thru the frames taken thru a green color filter.

In operation of the projector, the film strip F is advanced one frame at a time as in the usual manner of standard projection machines. However, two successive individual frames are exposed at the aperture plate 14 for simultaneous projection upon the screen. Thus, each frame is first exposed at the upper portion of the aperture plate during one picture cycle of the machine and then again at the lower portion of the aperture plate during the next picture cycle. In Figure 9 it will be seen that the filter shuttle 24 is in a position corresponding with that shown in Figure 3 with the pair of color filters 26 and 27 aligning with the aperture plate 14. In this position of the filter shuttle 24, one optical train or light system is from the light source 52 thru the red color filter 26, frame R and lens 54 to the screen 50, while a second optical train or light system is from the light source 52 thru the green color filter 27, frame G and lens 55 to the screen 50. Thus during the projection period, both frames R and G are associated with color filters of corresponding value. When the film is advanced one frame during the moving period of the picture cycle, the frames R and G' are exposed at the aperture plate opening 15. During this moving period of the film, the driving means C shifts the filter shuttle 24 thus aligning the color filters 28 and 29 with the aperture plates. Since the red frame R is now the lower one of the two exposed frames, the red filter 28 aligns with the frame R while the green filter 29 aligns with the frame G'. Thus, each frame of the film is twice projected upon the screen and thru a color filter of corresponding color value in each projection position of the frame. By exposing two frames of different color values and simultaneously projecting the two frames thru color filters of corresponding values as that of the frames at each projection or stationary period of the machine, the images will be projected upon the viewing screen in their natural colors.

While the color filters in the example illustrated have been shown disposed between the source of light and the film, it is to be understood that if so desired, the filter may either be disposed in front of the film or forwardly of the projection lens if such is desired. When projecting ordinary white and black films in the projecting machine, the filter shuttle may easily be removed from the projector, and the projector operated in its regular manner, only that two frames are simultaneously projected in superimposed relation upon the screen with no color effect. Since the pictures are taken in sequence, it will also be seen that when running black and white film, it is not essential to superimpose the two frames and the film may be projected equally as well in a standard projector having an aperture for unmasking only one frame at a time.

Thus it will be seen that novel and improved apparatus for projecting images in natural color upon a viewing screen has been provided wherein images which have been photographically recorded in sequence thru filters of different color values, are projected twice and in pairs thru color filters corresponding in value to that of the frames. The arrangement also allows for projection of the films so produced in black and white upon the viewing screen when the color effect is not desired. It will also be seen that due to the novel manner of obtaining and projecting the films that motion pictures in color may be produced at a cost much lower than any of the systems or methods of color photography now employed.

I claim:

1. In a motion picture projector including an aperture gate and a continuously rotated shutter shaft; a filter shuttle reciprocally guided on the aperture gate, a guide bar on the gate, a drive shaft rotated from the shutter shaft, a crank disc on the drive shaft, a slide member movable on the guide bar and connected to the shuttle, and a forked arm on the slide member and operatively engaging the crank disc for imparting harmonic movement to the shuttle.

2. In a color filter attachment for motion picture projectors including an aperture gate and a continuously driven shaft; a plate for attachment to the gate, a filter shuttle reciprocally guided on the plate, a slide member guided on the plate, a crank disc on said shaft and having a crank pin, coupling means between the slide member and shuttle, and a slotted arm on the slide member for receiving the crank pin, the slot in said arm being at a right angle to the direction of movement of the shuttle.

JOHN E. LEONARD.